United States Patent
Zhao

(10) Patent No.: US 11,973,599 B2
(45) Date of Patent: Apr. 30, 2024

(54) METHOD FOR TRANSMITTING FEEDBACK INFORMATION IN DIRECT COMMUNICATION AND TERMINAL

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 443 days.

(21) Appl. No.: 17/601,391

(22) PCT Filed: Apr. 9, 2019

(86) PCT No.: PCT/CN2019/081967
§ 371 (c)(1),
(2) Date: Oct. 4, 2021

(87) PCT Pub. No.: WO2020/206618
PCT Pub. Date: Oct. 15, 2020

(65) Prior Publication Data
US 2022/0209900 A1 Jun. 30, 2022

(51) Int. Cl.
*H04W 72/04* (2023.01)
*H04L 1/1812* (2023.01)

(52) U.S. Cl.
CPC ........... *H04L 1/1812* (2013.01); *H04W 72/04* (2013.01)

(58) Field of Classification Search
CPC .............................. H04L 1/1812; H04W 72/04

USPC .......................................................... 370/329
See application file for complete search history.

(56) References Cited

U.S. PATENT DOCUMENTS

2017/0347394 A1* 11/2017 Yasukawa ............. H04W 28/04

FOREIGN PATENT DOCUMENTS

CN 106303899 A 1/2017

OTHER PUBLICATIONS

Eckerman et al., Performance Analysis of Unsupervised LTE Device-to-Device (D2D) Communication , 2018, IEEE. (Year: 2018).*
Indian Patent Application No. 202147050272, Office Action dated Apr. 26, 2022, 6 pages.
European Patent Application No. 19923863.5, Search and Opinion dated Oct. 19, 2022, 11 pages.

* cited by examiner

*Primary Examiner* — Christopher R Crompton
(74) *Attorney, Agent, or Firm* — COZEN O'CONNOR

(57) ABSTRACT

A method for transmitting feedback information in direct communication and a first terminal are disclosed. The method includes: in response to a second terminal sending direct data to a first terminal with a first blind retransmission mechanism for a last time, transmitting by the first terminal, hybrid automatic repeat request (HARQ) feedback information to the second terminal, in which the HARQ feedback information is configured to indicate a receiving state of the first terminal for the direct data; and retransmitting by the first terminal, the HARQ feedback information to the second terminal with a second blind retransmission mechanism.

20 Claims, 5 Drawing Sheets

METHOD FOR TRANSMITTING FEEDBACK INFORMATION IN DIRECT COMMUNICATION AND TERMINAL

CROSS-REFERENCE TO RELATED APPLICATION

This application is the U.S. national phase application of International Application No. PCT/CN2019/081967, filed on Apr. 9, 2019, the entire contents of which are incorporated herein by reference for all purposes.

TECHNICAL FIELD

The disclosure relates to a field of communication technologies, and particularly to a method, an apparatus, a device and a system for transmitting feedback information in direct communication.

BACKGROUND

In a vehicle to everything (V2X) technology, an onboard device (i.e., a device that is mounted on the vehicle) may perform direct communication with other devices (such as other onboard devices, roadside infrastructure, handheld devices, etc.) through a sidelink.

The V2X technology supports a blind retransmission mechanism and a retransmission mechanism for hybrid automatic repeat request (HARQ) feedback. The blind retransmission mechanism refers to situations where a second terminal repeatedly transmits direct data to a first terminal without receiving the HARQ feedback information sent by the first terminal, so that the first terminal may receive direct data transmitted repeatedly even if the first terminal does not receive the direct data for the first transmission due to half duplex (that is, the first terminal is sending the direct data on time-frequency resources for sending or receiving the direct data), so as to ensure the reliability of data transmission. The retransmission mechanism for HARQ feedback refers to situations where the first terminal sends HARQ feedback information based on whether the direct data is correctly received after determining that the second terminal sends the direct data, and the second terminal determines whether to retransmit the direct data based on the HARQ feedback information.

SUMMARY

According to a first aspect of the disclosure, a method for transmitting feedback information in direct communication is provided. The method includes: in response to a second terminal sending direct data to a first terminal for a last time with a first blind retransmission mechanism, transmitting by the first terminal hybrid automatic repeat request (HARQ) feedback information to the second terminal, in which the HARQ feedback information is configured to indicate a receiving state the first terminal for the direct data; and retransmitting by the first terminal the HARQ feedback information to the second terminal with a second blind retransmission mechanism.

According to a second aspect of the disclosure, a method for transmitting feedback information in direct communication is provided. The method includes: in response to a second terminal sending direct data to a first terminal with a first blind retransmission mechanism for a last time, receiving by the second terminal hybrid automatic repeat request (HARQ) feedback information transmitted by the first terminal, the HARQ feedback information being configured to indicate a receiving state the first terminal for the direct data; and receiving by the second terminal the HARQ feedback information retransmitted by the first terminal with a second blind retransmission mechanism.

According to a third aspect of the disclosure, a first terminal is provided. The first terminal includes: a processor; and a memory configured to store instructions executable by the processor. The processor is configured to: in response to a second terminal sending direct data to the first terminal with a first blind retransmission mechanism for a last time, transmit hybrid automatic repeat request (HARQ) feedback information to the second terminal, in which the HARQ feedback information is configured to indicate a receiving state the first terminal for the direct data; and retransmit the HARQ feedback information to the second terminal with a second blind retransmission mechanism.

It should be understood that, the above general descriptions and latter detailed descriptions are only explanatory, and may not be a limitation of the disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The embodiments will be described in detail here, and examples thereof are shown in the accompanying drawings.

When the following descriptions refer to the accompanying drawings, unless otherwise indicated, the same numbers in different drawings represent the same or similar elements. The implementations described in the following embodiments do not represent all the implementations consistent with the disclosure. Rather, they are merely examples of the apparatuses and methods consistent with some aspects of the present disclosure as recited in the claims.

In the related art, a time interval between the time point when direct data is retransmitted for a last time and the time point when HARQ feedback information is transmitted may be preconfigured, so that after the second terminal sends direct data to the first terminal with the blind retransmission mechanism for the last time, the first terminal may determine the time point when HARQ feedback information is transmitted based on the time interval, and transmit the HARQ feedback information to the second terminal.

Since the preconfigured time interval is the same, when the last blind retransmissions for two pieces of direct data collide due to half duplex, the HARQ feedback transmissions for two pieces of direct data may collide with each other.

The network architecture and service scenario described in embodiments of the present disclosure are intended to explain the technical solutions of embodiments of the present disclosure more clearly, and does not constitute a limitation to the technical solutions based on embodiments of the present disclosure. Those skilled in the art know that, with the evolution of network architecture and the emergence of new service scenarios, the technical solutions based on embodiments of the present disclosure are also applied to similar technical problems.

Figure 1:
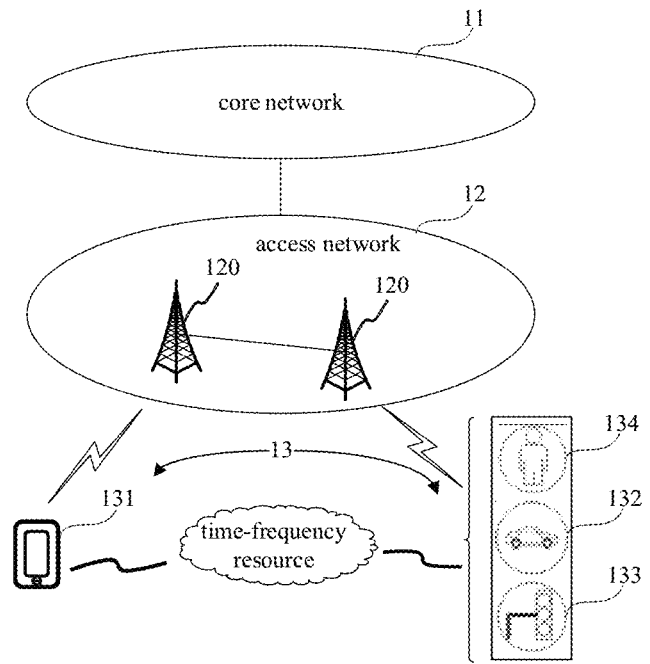
FIG. 1 is a diagram illustrating a network architecture applicable to embodiments of the present disclosure.

FIG. 1 is a diagram illustrating a network architecture which may be applicable to embodiments of the present disclosure. The network architecture may be a network architecture of a C-V2X system, in which C refers to a cellular, and the C-V2X system is a vehicle-mounted wireless communication system based on the evolution of 3G, 4G or 5G cellular network communication systems. The network architecture may include a core network 11, an access network 12 and a terminal 13.

The core network 11 includes several core network devices. The main function of the core network device is to provide user connections, management to users and completion of services carrying, an interface provided to an external network as a bear network. For example, the core network of a long term evolution (LTE) system may include devices such as a mobility management entity (MME), a serving gateway (S-GW), a PDN gateway (P-GW). The core network of a 5G new radio (NR) system may include devices such as an access and mobility management function (AMF) entity, a user plane function (UPF) entity and a session management function (SMF) entity.

The access network 12 includes several access network devices 120. The access network device 120 and the core network device 110 communicate with each other through some kind of interface technology, for example, an Si interface in the LTE system, an NG interface in the 5G NR system. The access network device 120 may be a base station (BS), and the base station is an apparatus deployed in the access network 12 to provide a wireless communication function for a terminal 13. The base station may include various forms of macro base stations, micro base stations, relay stations, access points, etc. In the system adopting different wireless access technologies, the name of the devices with the base station function may vary. For example, in an LTE system, it is referred to as eNodeB or eNB; in a 5G NR system, it is referred to as gNodeB or gNB. With evolution of communication technologies, the name of "base station" may vary. For convenience of description, in embodiments of the present disclosure, the above apparatus that provides the wireless communication function for the terminal 13 is collectively referred to as an access network device 120.

The terminal 13 may include various handheld devices with the wireless communication function, vehicle-mounted devices (onboard equipment), wearable devices, computing devices or other processing devices connected to wireless modems, as well as various forms of user equipment (UE), mobile stations (MS), terminal devices, etc. For convenience of description, the above device is collectively referred to as a terminal. The access network device 120 and the terminal 13 communicate with each other through some kind of air interface technology, for example, a Uu interface.

In embodiments of the disclosure, the terminal 13 includes a vehicle 131, other vehicle 132, infrastructure 133 and a pedestrian 134.

Vehicle to Vehicle (V2V) refers to communication between the vehicle 131 and other vehicle 132. The vehicle sends its relevant information to the other vehicle, in which the relevant information includes a driving speed, a geographical location, a driving direction and a driving state.

Vehicle to Infrastructure (V2I) refers to communication between the vehicle 131 and the infrastructure 133, and the infrastructure 133 includes all infrastructures in the driving process of the vehicle, including building facilities such as traffic lights, bus stations, buildings and tunnels.

Vehicle to Pedestrian (V2P) refers to communication between the vehicle 131 and the pedestrian 134. The pedestrian refers to a pedestrian that carries an electric device with a mobile communication capability, for example, a mobile phone and a wearable device, the wearable device including a smart bracelet, a smart watch and a smart ring, etc.

In embodiments of the present disclosure, the vehicle 131 is referred to as a first terminal, and the other vehicle 132, the infrastructure 133, and the pedestrian 134 are referred to as a second terminal, however, the two sides are interchangeable, which are not limited here.

Alternatively, the first terminal and the second terminal are terminals that support direct communication, and the above communication system may be an NR system and a subsequent evolution system.

The V2X direct communication in the LTE network may only support some V2X applications at the basic security level, for example, exchanging basic security information (BSM) such as cooperative awareness messages (CAM) or decentralized environmental notification message (DENM). Recently, with the development of technologies such as autonomous driving, new requirements have been proposed for the performance of V2X technology in order to support new V2X services. New V2X communication services and scenarios supported by a 5G NR technology have been planned by the 3GPP as an important content for Rel. 16. The 3GPP SA1 (Service Requirement) working group has established service requirements for some new V2X communication needs to meet, including vehicles platooning, extended sensors, advanced driving, and remote driving. In general, NR V2X direct communication needs to provide a higher communication rate, a shorter communication delay, and a more reliable communication quality.

It should be noted that the terminal 13 in the network architecture may be in a half-duplex communication mode or a full-duplex communication mode.

The half-duplex refers to that the direct data may not be transmitted and received simultaneously by the same terminal on the same time resources due to the presence of sending and receiving interferences. In a V2X service scenario, a plurality of services may exist on the terminal simultaneously. Some services need to send direct data and some need to receive direct data. When the terminal sends direct data on certain time resources, the terminal may not receive direct data sent by other terminals on the same time resources, even if the frequency domain resources occupied by the direct data sent are orthogonal to those occupied by the direct data received.

The full duplex refers to that direct data may be transmitted and received simultaneously by the same terminal on the same time resources.

To ensure the reliability of data transmission between the first terminal and the second terminal, in the NR V2X discussion, a radio access network (RAN1) decides to support the use of an HARQ feedback retransmission mechanism at a physical layer for unicast and multicast services in direct communication. In order to solve the half-duplex problem, a blind retransmission mechanism of the direct data without relying on feedback is supported.

The blind retransmission mechanism refers to that a second terminal repeatedly transmits direct data to a first terminal without receiving the HARQ feedback information sent by the first terminal, so that the first terminal may receive direct data repeatedly transmitted even if the first terminal does not receive the direct data for the first transmission due to half-duplex (that is, the first terminal sends direct data on time-frequency resources for sending the data), so as to ensure the reliability of data transmission. In embodiments, the first transmission of direct data or HARQ feedback information is referred to as a transmission process, and the second or subsequent transmissions of direct data or HARQ feedback information is referred to as a blind retransmission process.

The retransmission mechanism for HARQ feedback refers to that the first terminal sends HARQ feedback information based on whether the direct data is correctly received after the second terminal sends the direct data to the first terminal, and the second terminal determines whether to retransmit the direct data based on the HARQ feedback information. For the HARQ feedback retransmission mechanism in direct communication, the RAN1 decides to support a time interval between the HARQ feedback information transmission and the direct data transmission set by pre-configuration or system configuration.

Figure 2:
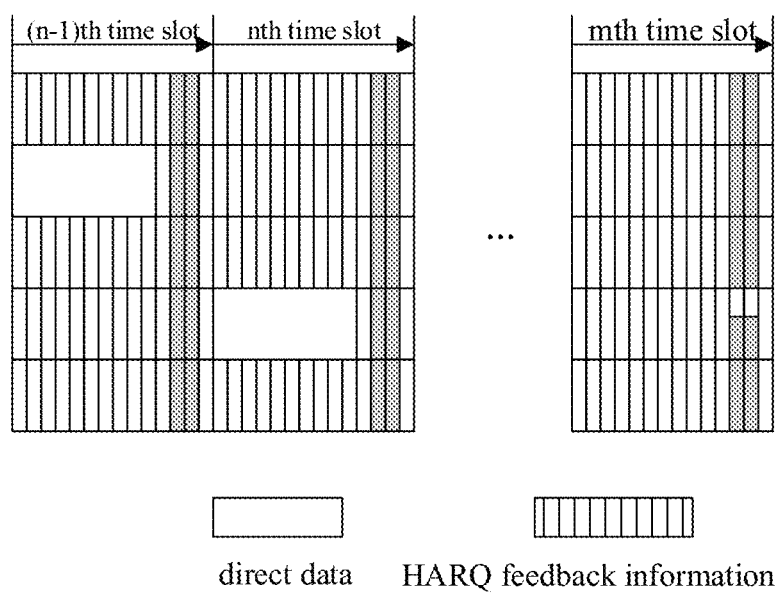
FIG. 2 is a flowchart illustrating a method for transmitting feedback information in direct communication in the related art.

When the second terminal and the first terminal adopt the HARQ feedback retransmission mechanism and the blind retransmission mechanism simultaneously, the first terminal transmits HARQ-ACK (that is, the HARQ feedback information) to a second terminal based on whether the direct data is correctly received after determining that the second terminal transmits direct data for the last time with the blind retransmission mechanism; the second terminal decides whether to retransmit the HARQ based on the HARQ-ACK (that is, whether to retransmit direct data to the first terminal with the blind retransmission mechanism). Referring to FIG. 2, the second terminal transmits the same direct data to the first data twice in the (n−1)th and the nth slots, and the first terminal transmits HARQ feedback information to the second terminal in the mth time unit, in which a value of n−m is preconfigured or configured by the system, n and m are positive integers. For the sake of distinction, in FIG. 2, an empty box represents direct data, and a shaded box with vertical lines represents HARQ feedback information. It needs to be noted that, the time resources configured to transmit the HARQ feedback information may be further configured, and a number of symbols and the location of symbols in the time resources are not limited in the embodiment. In a possible implementation, taking the time resources being the last second and third symbols in the time slot as an example, the time resources are represented in a grey box in FIG. 2 and the following figures.

In the related art, the time interval configured for each direct communication is the same. The direct communication herein refers to communication of direct data among different terminals, for example, a first terminal sending direct data to a second terminal is referred to as a direct communication, and a second terminal sending direct data to a third terminal is referred to as a direct communication. If the last blind retransmissions for two kinds of direct communication collide due to half duplex, HARQ feedback information for the two kinds of direct communication may collide with each other.

Figure 3:
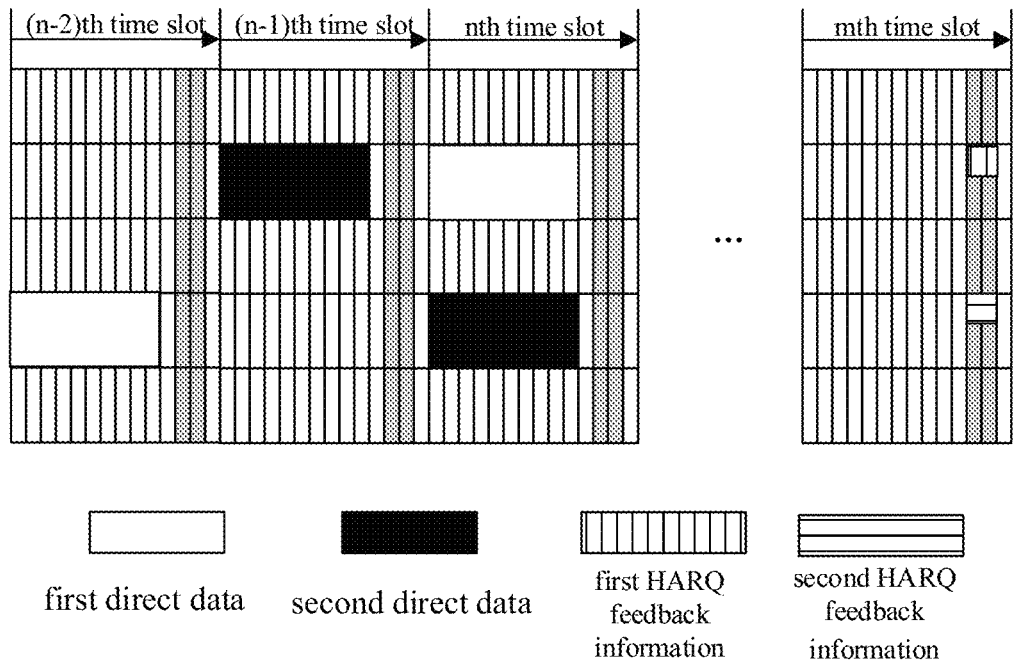
FIG. 3 is a flowchart illustrating a method for transmitting feedback information in direct communication in the related art.

Referring to FIG. 3, it is assumed that a number of blind retransmissions is 1, the second terminal transmits first direct data to the first terminal in the (n−2)th and the nth slots respectively, and the first terminal transmits second direct data to the third terminal in the (n−1)th and the nth time slots respectively. The first terminal needs to receive first direct data transmitted by the second terminal in the (n−2)th and the nth time slots respectively, and transmit the second direct data to the third terminal in the (n−1)th and the nth time slots respectively. As a result, the first terminal may receive the first direct data in the (n−2)th time slot; the first terminal may send the second direct data and may not receive the first direct data due to half duplex in the nth time slot. Since both the first direct data and the second direct data are transmitted in the nth time slot, and n−m is a preset value, in the mth time slot, the first terminal not only needs to send first HARQ feedback information for the first direct data to the second terminal, but also needs to receive second HARQ feedback information for the second direct data sent by the third terminal. The first terminal either may not send the first HARQ feedback information or may not receive the second HARQ feedback information due to the half-duplex. For the sake of distinction, in FIG. 3 and the following FIGS. 6-8, a white box represents the first direct data, a black box represents the second direct data, a shaded box with vertical lines represents the first HARQ feedback information and a shaded box with horizontal lines represents the second HARQ feedback information.

In embodiments of the disclosure, the first terminal may transmit HARQ feedback information with the blind retransmission mechanism. In this way, even if the second terminal may not receive the HARQ feedback information due to the half duplex, it may receive the retransmitted HARQ feedback information, thereby improving the reliability of transmitting HARQ feedback information.

The technical solution in the present disclosure is described in several example embodiments.

Figure 4:
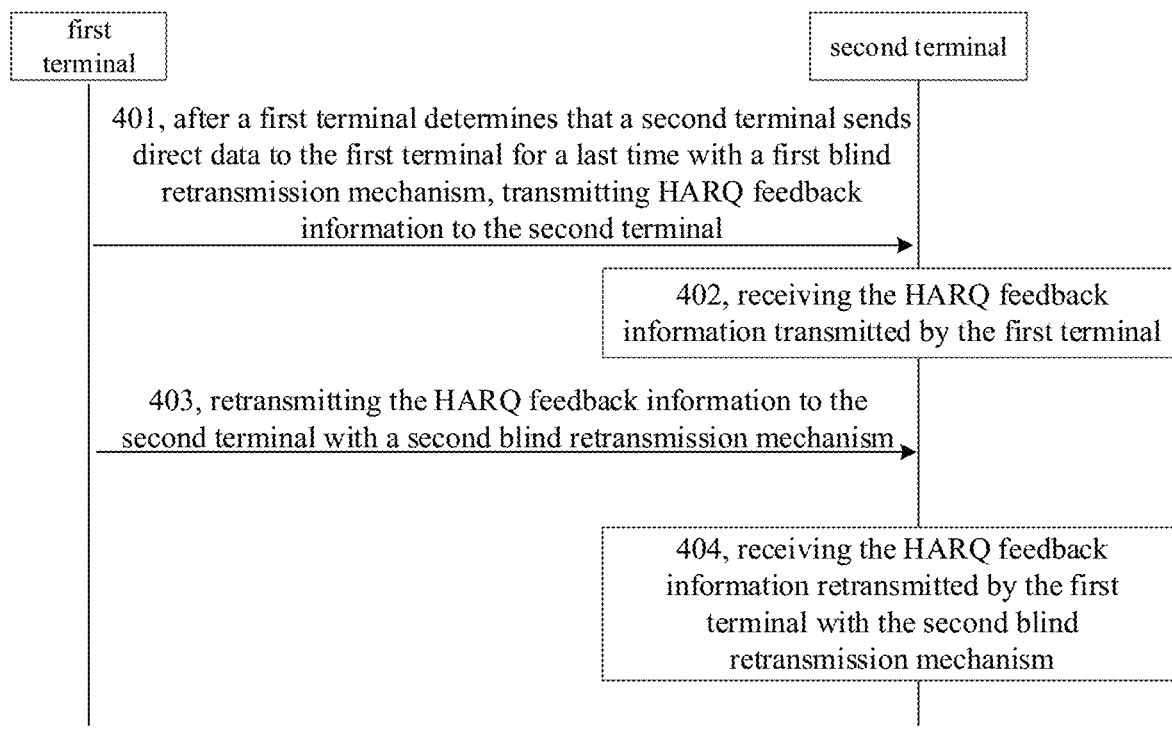
FIG. 4 is a flowchart illustrating a method for transmitting feedback information in direct communication according to an embodiment.

FIG. 4 is a flowchart illustrating a method for transmitting feedback information in direct communication according to an example embodiment. The method for transmitting feedback information in direct communication is applied to a network architecture as illustrated in FIG. 1. As illustrated in FIG. 4, the method for transmitting feedback information in direct communication includes the following steps.

At 401, in response to a second terminal sending direct data to a first terminal with a first blind retransmission mechanism for a last time, the first terminal transmits HARQ feedback information to the second terminal.

The direct data refers to physical layer data transmitted by the second terminal to the first terminal through a direct link.

The HARQ feedback information is configured to indicate a receiving state of the first terminal for the direct data after the blind retransmission of the direct data is completed. For example, the HARQ feedback information may be configured to indicate the first terminal has correctly received the direct data sent by the second terminal, or, the HARQ feedback information may be configured to indicate the first terminal has not correctly received the direct data sent by the second terminal.

The first blind retransmission mechanism is configured for the direct data, which may specify a number of retransmissions of direct data, a time interval between each two transmissions, etc.

At 402, the second terminal receives the HARQ feedback information transmitted by the first terminal.

The second terminal may not receive the HARQ feedback information due to the half duplex, and in order to ensure the reliability of transmitting HARQ feedback information, the first terminal may perform blind retransmission of the HARQ feedback information, that is, execute the step 403.

At 403, the first terminal retransmits the HARQ feedback information to the second terminal with a second blind retransmission mechanism.

The second blind retransmission mechanism is configured for the HARQ feedback information, which may specify a number of retransmissions of HARQ feedback information, a time interval between each two transmissions, etc.

The second blind retransmission mechanism may be the same as the first blind retransmission mechanism, and may be different from the first blind retransmission mechanism, which will not be limited here.

At 404, the second terminal receives the HARQ feedback information transmitted by the first terminal with the second blind retransmission mechanism.

The steps at 401 and 403 may be separately implemented as a first terminal side in an embodiment, and the steps at 402 and 404 may be separately implemented as a second terminal side in an embodiment.

In summary, in the method for transmitting feedback information in direct communication according to the disclosure, after the first terminal determines that the second terminal sends direct data to the first terminal with the first blind retransmission mechanism for the last time, the first terminal may transmit HARQ feedback information to the second terminal, so as to indicate a receiving state of the direct data after the blind retransmission is completed through the HARQ feedback information. Since the second terminal may not receive the HARQ feedback information due to some reasons, the first terminal needs to retransmit the HARQ feedback information to the second terminal with a second blind retransmission mechanism. In this way, even if the second terminal does not receive a certain transmission of the HARQ feedback information, the second terminal may receive the HARQ feedback information retransmitted, which may avoid wasting network resources caused by resending the direct data to the first terminal with the first blind retransmission mechanism since the second terminal mistakenly determines that the first terminal has not received the direct data. The effect of saving the network resources may be thus achieved.

Figure 5:
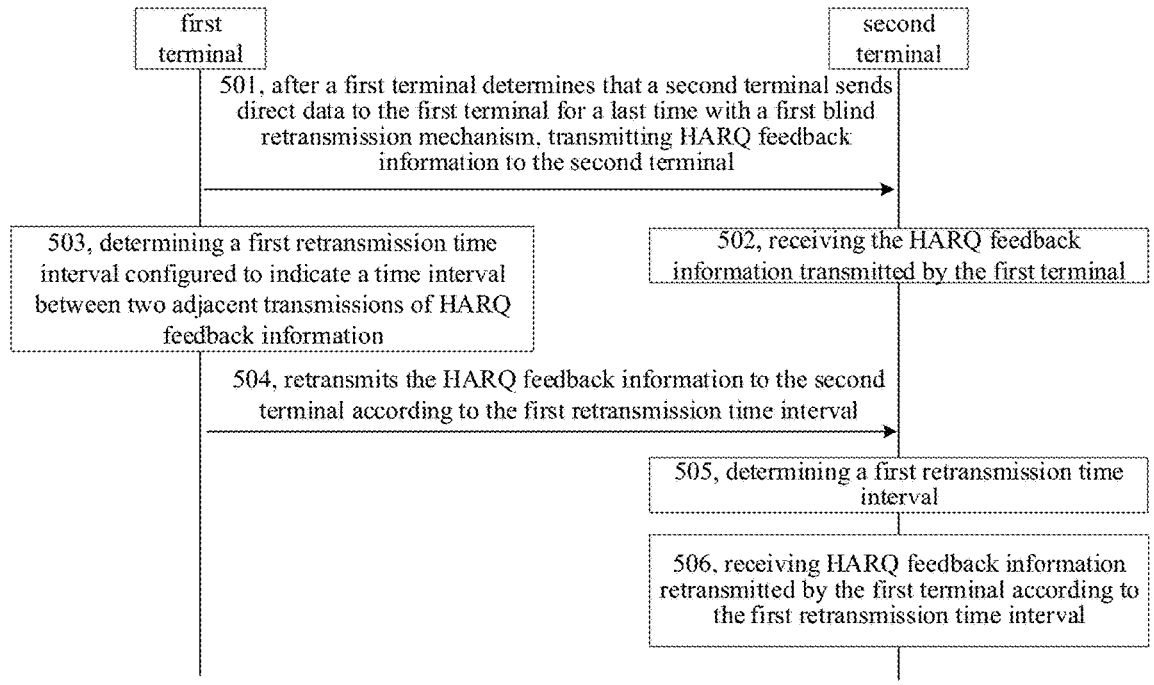
FIG. 5 is a flowchart illustrating a method for transmitting feedback information in direct communication according to another embodiment.

FIG. 5 is a flowchart illustrating a method for transmitting feedback information in direct communication according to another example embodiment. The method for transmitting feedback information in direct communication is applied to a network architecture as illustrated in FIG. 1. As illustrated in FIG. 5, the method for transmitting feedback information in direct communication includes the following steps.

At 501, in response to a second terminal sending direct data to the first terminal with a first blind retransmission mechanism for a last time, the first terminal transmits HARQ feedback information to the second terminal.

The direct data refers to physical layer data transmitted by the second terminal to the first terminal through a direct link.

The HARQ feedback information is configured to indicate a receiving state of the direct data after the blind retransmission is completed. For example, the HARQ feedback information may be configured to indicate the first terminal has correctly received direct data sent by the second terminal, or, the HARQ feedback information may be configured to indicate the first terminal has not correctly received direct data sent by the second terminal.

The first blind retransmission mechanism is configured for direct data, which may specify a number of retransmissions of direct data, a time interval between each transmission, etc.

After the second terminal sends the direct data to the first terminal with the first blind retransmission mechanism for the last time, the first terminal may acquire a preconfigured or a system-configured time interval between HARQ feedback information transmission and direct data transmission, and determines time resources for the HARQ feedback information based on the time resources for the last time of transmitting direct data and the time interval, and transmits the HARQ feedback information on the time resources to the second terminal. Taking FIG. 2 as an example, the time resources for the last time of transmitting the direct data is in the nth time slot, and the preconfigured or system-configured time interval is n–m, the first terminal may determine the time resources for transmitting the HARQ feedback information is in the mth time slot, and transmit the HARQ feedback information in the mth time slot to the second terminal.

At 502, the second terminal receives the HARQ feedback information transmitted by the first terminal.

The second terminal may acquire a preconfigured or a system-configured time interval between HARQ feedback information transmission and direct data transmission, and determines time resources for transmitting the HARQ feedback information based on the time resources for the last time of transmitting direct data and the time interval, and receives the HARQ feedback information transmitted by the first terminal on the time resources.

When the second terminal is in a half-duplex communication mode, and the first terminal transmits HARQ feedback information to the second terminal, the second terminal is transmitting HARQ feedback information to a third terminal and may not receive the HARQ feedback information transmitted by the first terminal. To improve the reliability of transmitting HARQ feedback information, the first terminal needs to retransmit the HARQ feedback information to the second terminal with a second blind retransmission mechanism, thereby avoiding wasting network resources caused by resending the direct data to the first terminal with the first blind retransmission mechanism since the second terminal mistakenly determines that the first terminal has not received direct data. The effect of saving the network resources may be thus achieved.

The second blind retransmission mechanism is configured for direct data, which may specify a number of retransmissions of direct data, a time interval between each transmission, etc.

The second blind retransmission mechanism may be the same as the first blind retransmission mechanism, and may be different from the first blind retransmission mechanism, which will not be limited here.

The implementation of retransmitting by the first terminal HARQ feedback information to the second terminal with a second blind retransmission mechanism are described below.

At 503, the first terminal determines a first retransmission time interval configured to indicate a time interval between two adjacent transmissions of HARQ feedback information.

The first retransmission time interval includes a time interval between HARQ feedback information retransmitted for the first time and HARQ feedback information transmitted for the first time, and a time interval between different retransmissions of HARQ feedback information.

There are various implementations of determining the first retransmission time interval by the first terminal. For example, different first retransmission time intervals may be set for each direct communication, or, the first retransmission time interval may be determined based on the resources for transmitting the HARQ feedback information, which will not be limited here. Three implementations of determining the first retransmission interval based on the resources for transmitting the HARQ feedback are described below.

In a first implementation, the first terminal acquires a first resource location where the HARQ feedback information is transmitted by the first terminal to the second terminal for the first time, and determines a first retransmission time interval based on the first resource location. Different first resource locations correspond to different first retransmission time intervals.

The first resource locations here are locations of first resources, the first resources being one of time resources, frequency resources and code resources. Taking the first resources being first frequency resources as an example, the implementation process is introduced.

When the first terminal transmits HARQ feedback information to the second terminal on a certain time resource for a first time, the first terminal needs to receive HARQ feedback information transmitted by the third terminal on said time resource, and the first frequency resources occupied by the two pieces of HARQ feedback information must be different. Therefore, the first retransmission time interval may be determined based on the first frequency resource location where the HARQ feedback is transmitted, and different first frequency resource locations may be specified to correspond to different first retransmission time intervals. In this way, it may ensure that the two pieces of HARQ feedback information are retransmitted without occupying the same time resources, so as to avoid the possibility of a time domain overlap in retransmitting the two pieces of HARQ feedback information. The first frequency resource location may be a start location of the first frequency resource and/or an end location of the first frequency resource.

In the embodiment, there are various implementations for the first terminal to determine a first retransmission time interval based on the first resource location. For example, an input parameter may be set as a first resource location, and an output parameter may be set as a formula of the first retransmission time interval. Alternatively, a first corresponding relationship between different first resource locations and different first retransmission time intervals may be set, which will not be limited here.

When the first retransmission time interval is determined through the first corresponding relationship, determining by the first terminal the first retransmission time interval based on the first resource location, includes: acquiring by the first terminal a first corresponding relationship configured to indicate a relationship between the first resource locations and the first retransmission time intervals; querying by the first terminal a first retransmission time interval corresponding to the acquired first resource location in the first corresponding relationship.

The first corresponding relationship may be preconfigured or system-configured. A preconfigured corresponding relationship refers to that an access network device configures a first corresponding relationship for the first terminal. The access network device may generate configuration information containing the first corresponding relationship in advance and sends the configuration information to the first terminal. The first terminal may receive the configuration information sent by the access network device and read the corresponding relationship from the configuration information. A system-configured corresponding relationship refers to a first corresponding relationship predefined in a communication protocol, in this case, the first terminal may directly read the corresponding relationship.

The first terminal may query a corresponding first retransmission time interval in the first corresponding relationship based on the acquired first resource location after the first corresponding relationship is obtained.

Figure 6:
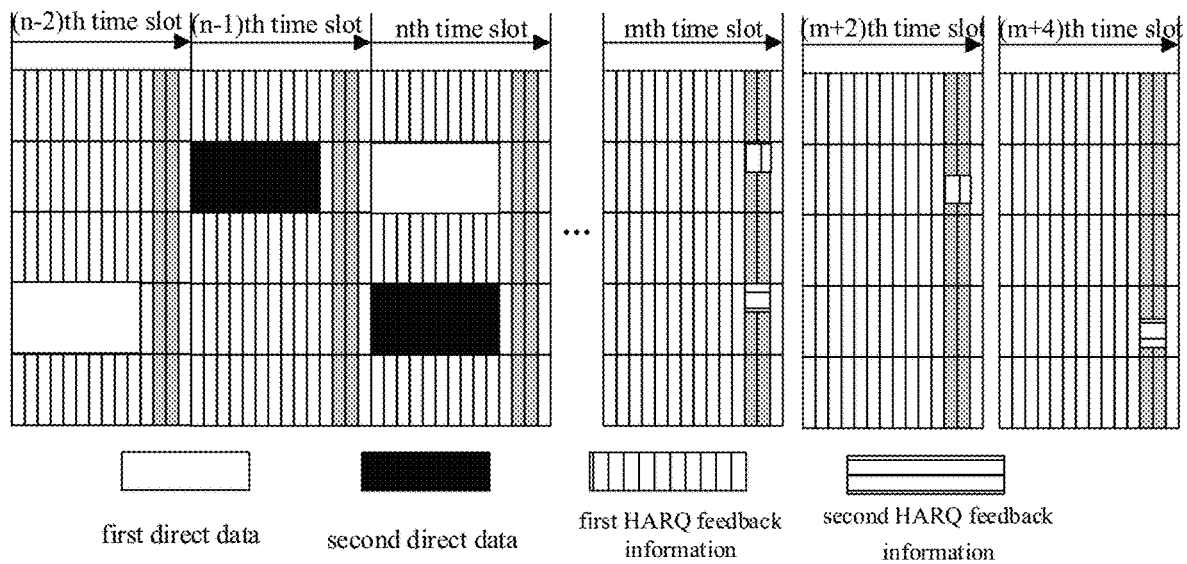
FIG. 6 is a diagram illustrating a feedback information transmission in direct communication according to another embodiment.

Referring to FIG. 6, taking the first resources being first frequency resources as an example, when the first terminal transmits HARQ feedback information to the second terminal in the mth time slot for a first time, the first terminal also needs to receive HARQ feedback information transmitted by the third terminal in the mth time slot, and the first frequency resources occupied by the two pieces of HARQ feedback information must be different. It is assumed that in the first corresponding relationship, the first resource location where the HARQ feedback information is transmitted to the second terminal corresponds to a first retransmission time interval with two time slots, and the first resource location where the HARQ feedback information transmitted by the third terminal is received corresponds to a first retransmission time interval with four time slots, then the first terminal may transmit the HARQ feedback information to the second terminal in the (m+2)th time slot, and receive the HARQ feedback information transmitted by the third terminal in the (m+4)th time slot.

It should be noted that since the first resource location is fixed where the HARQ feedback information is transmitted for the first time, the first retransmission time interval queried in the first corresponding relationship is also fixed, that is, the time interval for each retransmission of HARQ feedback information is the same.

In a second implementation, the first terminal acquires a second resource location where HARQ feedback information is transmitted to the second terminal for a last time; and the first terminal determines a first retransmission time interval based on the second first resource location, in which different second resource locations correspond to different first retransmission time intervals.

The second implementation is distinguished from the first implementation in that, the second resource location acquired in the second implementation is a resource location where the HARQ feedback information is transmitted to the second terminal for the last time, rather than a resource location where the HARQ feedback information is transmitted to the second terminal for the first time.

Similarly, there are various implementations for the first terminal to determine a first retransmission time interval based on the second resource location. For example, an input parameter may be set as a second resource location, and an output parameter may be set as a formula of the first retransmission time interval. Alternatively, a second corresponding relationship between different second resource locations and different first retransmission time intervals may be set, which will not be limited here.

When the first retransmission time interval is determined by the second corresponding relationship, determining by the first terminal the first retransmission time interval based on the second resource location, includes: acquiring by the first terminal a second corresponding relationship configured to indicate a relationship between the second resource locations and the second retransmission time intervals; querying by the first terminal a first retransmission time interval corresponding to the acquired second resource location in the second corresponding relationship. The implementation may refer to descriptions of the first implementation.

In a third implementation, the first terminal acquires a second retransmission time interval configured to indicate a time interval between two adjacent transmissions of direct data; the first terminal determines the second retransmission time interval as a first retransmission time interval.

When the direct data transmitted by the second terminal to the first terminal each time collides with the direct data transmitted by the first terminal to the third terminal, there may be a transmission or reception problem for the terminal, and no HARQ feedback information need to be transmitted. When the direct data transmitted by the second terminal to the first terminal does not collide with the direct data transmitted by the first terminal to the third terminal for at least one time, the time interval of transmitting by the second terminal the direct data to the first terminal must be different from the time interval of transmitting by the first terminal the direct data to the third terminal. Therefore, the first retransmission time interval may be determined based on the second retransmission time interval of transmitting the direct data, so that a collision may not occur each time when the two pieces of HARQ feedback information are retransmitted.

Alternatively, if each second retransmission time interval is the same when the direct data is retransmitted, each first retransmission time interval is the same.

Alternatively, if each second retransmission time interval is different when the direct data is retransmitted, the first retransmission time interval is calculated based on each second retransmission time interval. For example, all second retransmission time intervals are averaged to obtain an average value as the first retransmission time interval. Alternatively, an intermediate value of all second retransmission time intervals may be configured as the first retransmission time interval. Alternatively, the second retransmission time intervals for different numbers of retransmissions may be configured as the first retransmission time intervals for the corresponding a number of retransmissions. For example, the second retransmission time interval between the first and the second direct data retransmissions is 1 time slot, and the second retransmission time interval between the second and the third direct data retransmissions is 2 time slots, the first retransmission time interval between the first and the second HARQ feedback information retransmissions is 1 time slot, and the first retransmission time interval between the second and the third HARQ feedback information retransmissions is 2 time slots.

Figure 7:
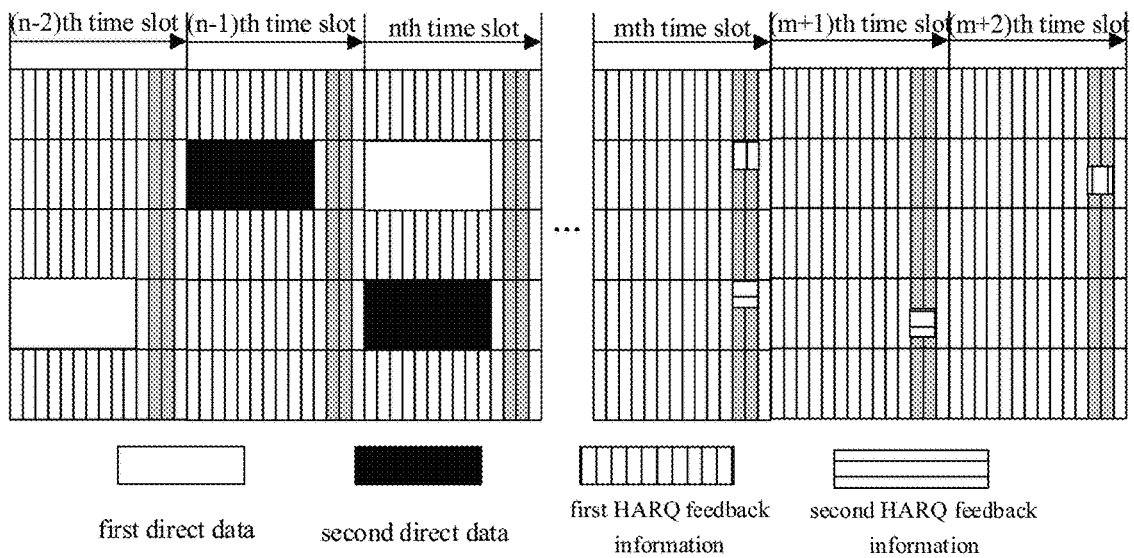
FIG. 7 is a diagram illustrating a feedback information transmission in direct communication according to another embodiment.

Refer to FIG. 7, the second retransmission time interval when the second terminal retransmits direct data to the first terminal is 2 time slots, and the second retransmission time interval when the first terminal retransmits direct data to the third terminal is 1 time slot. When the first terminal, in the mth time slot, transmits HARQ feedback information to the second terminal for a first time and needs to receive HARQ feedback information transmitted by the third terminal, the first terminal may transmit the HARQ feedback information to the second terminal in the (m+1)th time slot, and receive the HARQ feedback information transmitted by the third terminal in the (m+2)th time slot.

At 504, the first terminal retransmits the HARQ feedback information to the second terminal based on the first retransmission time interval.

The first terminal may determine a set of resources for retransmitting HARQ feedback information and retransmit the HARQ feedback information to the second terminal with the resources in the set of resources based on the set of resources for transmitting the HARQ feedback information for a first time and the first retransmission time interval. The set of resources includes at least one of time resources, frequency resources and code resources.

The above implementation may ensure the same retransmission does not collide when different HARQ feedback information are retransmitted. However, different retransmissions may further collide, orthogonal resources may be thus selected for different retransmissions, ensuring different retransmissions may not collide.

In a possible implementation, the first terminal retransmits the HARQ feedback information to the second terminal based on the first retransmission time interval, including:

1) The first terminal determines a set of resources for retransmitting HARQ feedback information based on the first retransmission time interval, in which the set of resources includes at least one of time resources, frequency resources, and code resources.
2) The first terminal divides the set of resources into at least two subsets of orthogonal resources.

The first terminal may determine a division way of a set of resources based on the configuration of the access network device, thereby acquiring at least two subsets of orthogonal resources. The division ways of time resources, frequency resources and code resources are the same, and the frequency resources is taken as an example to describe the division of resources below.

Figure 8:
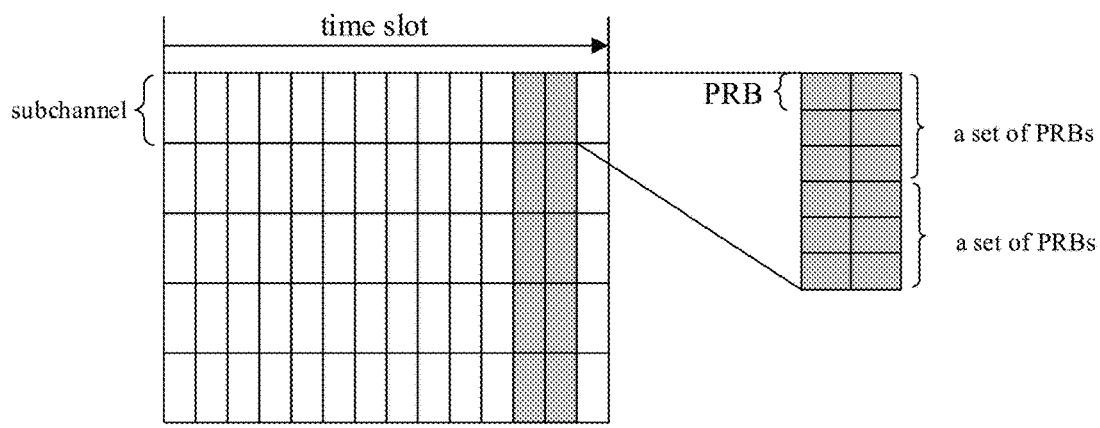
FIG. 8 is a diagram illustrating a resource division according to another example embodiment.

For example, RAN1 has decided to determine a subchannel as the minimum unit of allocation in the frequency domain resources, in which each subchannel includes a plurality of physical resource blocks (PRB). A frequency resource pool in direct communication includes a plurality of subchannels. In each subchannel, the frequency resources for transmitting HARQ feedback information may be divided into a plurality of subsets of orthogonal frequency resources. Referring to FIG. 8, it is assumed that the frequency resources include 5 subchannels, each subchannel includes 6 PRBs, and the last second and third orthogonal frequency division multiplexing (OFDM) symbols in each time slot may be configured to transmit HARQ feedback information, the first terminal may divide each subchannel into two sets of PRBs including different orthogonal frequency resources (that is, PRB0, 1, 2 being a set of PRBs, and PRB3, 4, 5 being a set of PRBs). When the set of resources includes frequency resources, the first terminal may configure each set of PRBs as a subset of resources.

Similarly, when the set of resources includes time resources, the first terminal may divide the time resources as a set of orthogonal symbols, and each set of symbols as a subset of resources.

Similarly, when the set of resources includes code resources, the first terminal may divide the code resources as a set of orthogonal code resources, and each set of code resources as a subset of resources.

When the set of resources includes frequency resources and time resources, the first terminal may determine both a set of PRBs and a set of symbols as a subset of resources. When the set of resources includes frequency resources and code resources, the first terminal may determine both a set of PRBs and a set of symbols as a subset of resources. When the set of resources includes time resources and frequency resources, the first terminal may determine both a set of symbols and a set of code resources as a subset of resources. When the set of resources includes frequency resources, time resources and code resources, the first terminal may determine a set of PRBs, a set of symbols and a set of code resources as a subset of resources.

3) The first terminal retransmits HARQ feedback information to the second terminal with resources in a target subset of resources from the at least two subsets of orthogonal resources based on a number of retransmissions, different numbers of retransmissions corresponding to different target subsets of resources.

In the embodiment, a corresponding relationship between different numbers of retransmissions and different subsets of target resources may be preconfigured or system-configured. In this way, the first terminal may select a target subset of resources from the at least two target subsets of orthogonal resources based on the current number of retransmissions, and retransmit HARQ feedback information to the second terminal with resources in the target subset of resources. The target subset of resources is a subset of resources selected at this time.

For example, the number of retransmissions being 1 corresponds to a subset 1 of resources, and the number of retransmissions being 2 corresponds to a subset 2 of resources. When the first terminal retransmits HARQ feedback information to the second terminal for a first time, the first terminal selects a subset 1 of resources, and takes the subset 1 of resources as a target subset of resources, and retransmits HARQ feedback information to the second terminal with resources in the subset 1 of resources.

The implementation is described below where the second terminal receives HARQ feedback information retransmitted by the first terminal with a second blind retransmission mechanism.

At 505, the second terminal determines a first retransmission time interval.

When the first terminal transmits HARQ feedback information to the second terminal with the second blind retransmission mechanism, the second terminal needs to determine a resource location of the retransmitted HARQ feedback information, and receive the HARQ feedback information on the resource location. The second terminal here may determine the first retransmission time interval first, and then determine the resource location based on the first retransmission time interval.

The implementation of determining by the second terminal a first retransmission time interval is same as the implementation of determining by the first terminal a first retransmission time interval. Three implementations are described below.

In a first implementation, the second terminal acquires a first resource location where the HARQ feedback information transmitted by the first terminal is received for a first time; and the second terminal determines a first retransmission time interval based on the first resource location, different first resource locations corresponding to different first retransmission time intervals.

The first resource location here is a location of first resources, the first resources being one of time resources, frequency resources and code resources.

In the embodiment, there are various implementations for the second terminal to determine the first retransmission time interval based on the first resource location. For example, an input parameter may be set as a first resource location, and an output parameter may be set as a formula of the first retransmission time interval. Alternatively, a first corresponding relationship between different first resource locations and different first retransmission time intervals may be set, which will not be limited here.

When the first retransmission time interval is determined through the first corresponding relationship, determining by the second terminal the first retransmission time interval based on the first resource location, includes: acquiring by the second terminal a first corresponding relationship configured to indicate a relationship between the first resource locations and the first retransmission time intervals; querying by the second terminal a first retransmission time interval corresponding to the acquired first resource location in the first corresponding relationship.

In a second implementation, the second terminal acquires a second resource location where HARQ feedback information transmitted by the first terminal is received for a last time; and the second terminal determines a first retransmission time interval based on the second first resource location, different first resource locations corresponding to different first retransmission time intervals.

Similarly, there are various implementations for the second terminal to determine a first retransmission time interval based on the second resource location. For example, an input parameter may be set as a second resource location, and an output parameter may be set as a formula of the first retransmission time interval. Alternatively, a second corresponding relationship between different second resource locations and different first retransmission time intervals may be set, which will not be limited here.

When the first retransmission time interval is determined by the second corresponding relationship, determining by the second terminal the first retransmission time interval based on the second resource location, includes: acquiring by the second terminal a second corresponding relationship configured to indicate a relationship between the second resource locations and the second retransmission time intervals; querying by the second terminal a first retransmission time interval corresponding to the acquired second resource location in the second corresponding relationship.

In a third implementation, the second terminal acquires a second retransmission time interval configured to indicate a time interval between two adjacent transmissions of direct data; the second terminal determines the second retransmission time interval as a first retransmission time interval.

The details of the above three implementations refer to the descriptions of 503, which is not repeated here.

At 506, the second terminal receives HARQ feedback information retransmitted by the first terminal based on the first retransmission time interval.

The second terminal may determine a set of resources for retransmitting HARQ feedback information and receive the HARQ feedback information retransmitted by the first terminal with the resources in the set of resources based on the set of resources for receiving the HARQ feedback information for a first time and the first retransmission time interval. The set of resources includes at least one of time resources, frequency resources and code resources.

In a possible implementation, the second terminal receives the HARQ feedback information retransmitted by the first terminal with a second blind retransmission mechanism based on the first retransmission time interval, including:

1) The second terminal determines a set of resources for retransmitting HARQ feedback information based on the first retransmission time interval, the set of resources including at least one of time resources, frequency resources, and code resources.
2) The second terminal divides the set of resources into at least two subsets of orthogonal resources.
3) The second terminal receives the HARQ feedback information retransmitted by the first terminal with a target subset of resources from the at least two subsets of orthogonal resources based on a number of retransmissions, different numbers of retransmissions corresponding to different target subsets of resources.

The details of the above implementation refer to descriptions of 504, which is not repeated here.

It needs to be noted that, when the HARQ feedback information transmitted by the first terminal to the second terminal is referred to as first HARQ feedback information, the method may further include: acquiring by the first terminal configuration information; determining by the first terminal to transmit the first HARQ feedback information to the second terminal based on the configuration information; or, determining by the first terminal to receive second HARQ feedback information transmitted by the third terminal based on the configuration information, in which the time resources for transmitting the first HARQ feedback information are the same as the time resources for transmitting the second HARQ feedback information.

The configuration information may be preconfigured or system-configured.

That is, when transmitting the first HARQ feedback information collides with receiving the second HARQ feedback information, the first terminal may decide whether to transmit the first HARQ feedback information first or to receive the second HARQ feedback information first based on the configuration information.

The steps of 501, and 503-504 may be separately implemented as a first terminal side in an embodiment, and the steps of 502, and 505-506 may be separately implemented as a second terminal side in an embodiment.

In summary, in the method for transmitting feedback information in direct communication according to the disclosure, after the first terminal determines that the second terminal sends direct data to the first terminal with the first blind retransmission mechanism for the last time, the first terminal may transmit HARQ feedback information to the second terminal, so as to indicate a receiving state of the direct data after the blind retransmission is completed through the HARQ feedback information. Since the second terminal may not receive the HARQ feedback information due to some reasons, the first terminal needs to retransmit the HARQ feedback information to the second terminal with the second blind retransmission mechanism. In this way, even if the second terminal does not receive a certain transmission of the HARQ feedback information, the second terminal may receive the retransmitted HARQ feedback information, which may avoid wasting network resources caused by resending the direct data to the first terminal with the first blind retransmission mechanism since the second terminal mistakenly determines that the first terminal has not received direct data. The effect of saving the network resources may be thus achieved.

Figures 9, 10, 11:
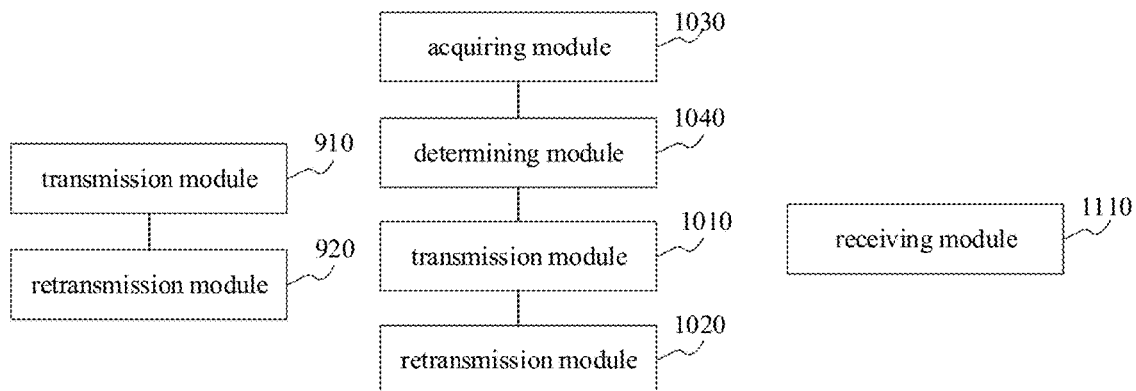
FIG. 9 is a block diagram illustrating an apparatus for transmitting feedback information in direct communication according to an embodiment.
FIG. 10 is a block diagram illustrating an apparatus for transmitting feedback information in direct communication according to an embodiment.
FIG. 11 is a block diagram illustrating an apparatus for transmitting feedback information in direct communication according to an embodiment.

FIG. 9 is a block diagram illustrating an apparatus for transmitting feedback information in direct communication according to an example embodiment. The apparatus for transmitting feedback information in direct communication is applied to a network architecture as illustrated in FIG. 1. As illustrated in FIG. 9, the apparatus for transmitting feedback information in direct communication includes a transmission module 910 and a retransmission module 920; the transmission module 910 is configured to, after determining that a second terminal sends direct data to a first terminal with a first blind retransmission mechanism for a last time, transmit HARQ feedback information to the second terminal, the HARQ feedback information being configured to indicate a receiving state of the direct data after the blind retransmission is completed; the retransmission module 920 is configured to retransmit HARQ feedback information to a second terminal with a second blind retransmission mechanism.

In summary, in the apparatus for transmitting feedback information in direct communication according to the disclosure, after the first terminal determines that the second terminal sends direct data to the first terminal with the first blind retransmission mechanism for the last time, the first terminal may transmit HARQ feedback information to the second terminal, so as to indicate a receiving state of the direct data after the blind retransmission is completed through the HARQ feedback information. Since the second terminal may not receive the HARQ feedback information due to some reasons, the first terminal needs to retransmit the HARQ feedback information to the second terminal with the second blind retransmission mechanism. In this way, even if the second terminal does not receive a certain transmission of the HARQ feedback information, the second terminal may receive the retransmitted HARQ feedback information, which may avoid wasting network resources caused by resending the direct data to the first terminal with a first blind retransmission mechanism since the second terminal mistakenly determines that the first terminal has not received direct data. The effect of saving the network resources may be thus achieved.

FIG. 10 is a block diagram illustrating an apparatus for transmitting feedback information in direct communication according to an example embodiment. The apparatus for transmitting feedback information in direct communication is applied to a network architecture as illustrated in FIG. 1. As illustrated in FIG. 10, the apparatus for transmitting feedback information in direct communication includes a transmission module 1010 and a retransmission module 1020; the transmission module 1010 is configured to, after determining that a second terminal sends direct data to a first terminal with a first blind retransmission mechanism for a last time, transmit HARQ feedback information to the second terminal, the HARQ feedback information being configured to indicate a receiving state of the direct data after the blind retransmission is completed; the retransmission module 1020 is configured to retransmit the HARQ feedback information to a second terminal with a second blind retransmission mechanism.

In a possible implementation, the retransmission module 1020 is further configured to: determine a first retransmission time interval configured to indicate a time interval between two adjacent transmissions of the HARQ feedback information; retransmit the HARQ feedback information to a second terminal based on the first retransmission time interval.

In a possible implementation, the retransmission module 1020 is further configured to:

acquire a first resource location where the HARQ feedback information is transmitted to a second terminal for a first time, and determine the first retransmission time interval based on the first resource location, different first resource locations corresponding to different first retransmission time intervals; or, acquire a second resource location where the HARQ feedback information is transmitted to a second terminal for a last time, and determine the first retransmission time interval based on the second resource location, different second resource locations corresponding to different first retransmission time intervals.

In a possible implementation, the retransmission module 1020 is further configured to: acquire a first corresponding relationship configured to indicate a relationship between the first resource locations and the first retransmission time intervals; query a first retransmission time interval corresponding to the acquired first resource location in the first corresponding relationship.

In a possible implementation, the retransmission module 1020 is further configured to: acquire a second corresponding relationship configured to indicate a relationship between the second resource locations and the second retransmission time intervals; query a first retransmission time interval corresponding to the acquired second resource location in the second corresponding relationship.

In a possible implementation, the retransmission module 1020 is further configured to: acquire a second retransmission time interval configured to indicate a time interval between two adjacent transmissions of the direct data; determine the second retransmission time interval as a first retransmission time interval.

In a possible implementation, the retransmission module 1020 is further configured to: determine resources for retransmitting HARQ feedback information based on the first retransmission time interval, the resources including at least one of time resources, frequency resources, and code resources; divide the set of resources into at least two subsets of orthogonal resources; retransmit HARQ feedback information to the second terminal with resources in a target subset of resources from the at least two subsets of orthogonal resources based on a number of retransmissions, different numbers of retransmissions corresponding to different target subsets of resources.

In a possible implementation, the HARQ feedback information is first HARQ feedback information. The apparatus further includes an acquiring module 1030 and a determining module 1040; the acquiring module 1030 is configured to acquire configuration information; the determining module 1040 is configured to determine to transmit the first HARQ feedback information to the second terminal based on the configuration information; or, determine to receive second HARQ feedback information transmitted by a third terminal based on the configuration information, the time resources for transmitting the first HARQ feedback information being the same as the time resources for transmitting the second HARQ feedback information.

In summary, in the apparatus for transmitting feedback information in direct communication according to the disclosure, after the first terminal determines that the second terminal sends direct data to the first terminal with the first blind retransmission mechanism for the last time, the first terminal may transmit HARQ feedback information to the second terminal, so as to indicate a receiving state of the direct data after the blind retransmission is completed through the HARQ feedback information. Since the second terminal may not receive the HARQ feedback information due to some reasons, the first terminal needs to retransmit the HARQ feedback information to the second terminal with the second blind retransmission mechanism. In this way, even if the second terminal does not receive a certain transmission of the HARQ feedback information, the second terminal may receive the retransmitted HARQ feedback information, which may avoid wasting network resources caused by resending the direct data to the first terminal with the first blind retransmission mechanism since the second terminal mistakenly determines that the first terminal has not received direct data. The effect of saving the network resources may be thus achieved.

FIG. 11 is a block diagram illustrating an apparatus for transmitting feedback information in direct communication according to an example embodiment. The apparatus for transmitting feedback information in direct communication is applied to a network architecture as illustrated in FIG. 1. As illustrated in FIG. 11, the apparatus for transmitting feedback information in direct communication includes a receiving module 1110; the receiving module 1110 is configured to, after sending direct data to a first terminal with a first blind retransmission mechanism for a last time, receive hybrid automatic repeat request (HARQ) feedback information transmitted by the first terminal, the HARQ feedback information being configured to indicate a receiving state of the direct data after a blind retransmission is completed; the receiving module 1110 is further configured to receive the HARQ feedback information retransmitted by the first terminal with a second blind retransmission mechanism.

In a possible implementation, the receiving module 1110 is further configured to: determine a first retransmission time interval configured to indicate a time interval between two adjacent transmissions of the HARQ feedback information; and receive the HARQ feedback information retransmitted by the first terminal based on the first retransmission time interval.

In a possible implementation, the receiving module 1110, is further configured to: acquire a first resource location where the HARQ feedback information transmitted by the first terminal is received for a first time, and determine a first retransmission time interval based on the first resource location, different first resource locations corresponding to different first retransmission time intervals; or, acquire a second resource location where the HARQ feedback information transmitted by the first terminal is received for a last time, and determine a first retransmission time interval based on the second resource location, different second resource locations corresponding to different first retransmission time intervals.

In a possible implementation, the receiving module 1110, is further configured to: acquire a first corresponding relationship configured to indicate a relationship between the first resource locations and the first retransmission time intervals; query a first retransmission time interval corresponding to the acquired first resource location in the first corresponding relationship.

In a possible implementation, the receiving module 1110 is further configured to: acquire a second corresponding relationship configured to indicate a relationship between the second resource locations and the second retransmission time intervals; query a first retransmission time interval corresponding to the acquired second resource location in the second corresponding relationship.

In a possible implementation, the receiving module 1110 is further configured to: acquire a second retransmission time interval configured to indicate a time interval between two adjacent transmissions of the direct data; determine the second retransmission time interval as the first retransmission time interval.

In a possible implementation, the receiving module 1110, is further configured to: determine a set of resources for retransmitting HARQ feedback information based on the first retransmission time interval, the set of resources including at least one of time resources, frequency resources, and code resources; divide the set of resources into at least two subsets of orthogonal resources; receive by the first terminal HARQ feedback information retransmitted with a target subset of resources from the at least two subsets of orthogonal resources based on a number of retransmissions, different numbers of retransmissions corresponding to different target subsets of resources.

In summary, in the apparatus for transmitting feedback information in direct communication according to the disclosure, after direct data is sent to the first terminal with the first blind retransmission mechanism for the last time, the second terminal may receive HARQ feedback information transmitted by the first terminal, so as to indicate a receiving state of the direct data after the blind retransmission is completed through the HARQ feedback information. Since the second terminal may not receive the HARQ feedback information due to some reasons, the first terminal needs to retransmit the HARQ feedback information to the second terminal with the second blind retransmission mechanism. In this way, even if the second terminal does not receive the HARQ feedback information of a certain transmission, the second terminal may receive the retransmitted HARQ feedback information, which may avoid wasting network resources caused by resending the direct data to the first terminal with the first blind retransmission mechanism since the second terminal mistakenly determines that the first terminal has not received direct data. The effect of saving the network resources may be thus achieved.

It should be noted that, when the apparatus according to the above embodiments implements its functions, only the division of the above function modules is illustrated. In practical applications, the above functions may be completed by different function modules based on actual requirements, that is, the content structure of the device is divided into different function modules to complete all or part of functions described above.

With regard to the apparatus in the above embodiments, the specific way in which each module performs the operation has been described in detail in the method embodiments, which will not be elaborated here.

According to an example embodiment in the disclosure, there is provided that a first terminal that may implement the method for transmitting feedback information in direct communication in the disclosure. The first terminal includes a processor and a memory configured to store instructions executable by the processor.

The processor is configured to: after determining that a second terminal sends direct data to a first terminal with a first blind retransmission mechanism for a last time, transmit HARQ feedback information to the second terminal, the HARQ feedback information being configured to indicate a receiving state of the direct data after the blind retransmission is completed; and retransmit the HARQ feedback information to the second terminal with a second blind retransmission mechanism.

According to an example embodiment in the disclosure, there is provided that a second terminal that may implement the method for transmitting feedback information in direct communication in the disclosure. The second terminal includes a processor and a memory configured to store instructions executable by the processor.

The processor is configured to: after sending direct data to a first terminal with a first blind retransmission mechanism for a last time, receive hybrid automatic repeat request (HARQ) feedback information transmitted by the first terminal, the HARQ feedback information being configured to indicate a receiving state of the direct data after the blind retransmission is completed; and receive the HARQ feedback information retransmitted by the first terminal with a second blind retransmission mechanism.

Figure 12:
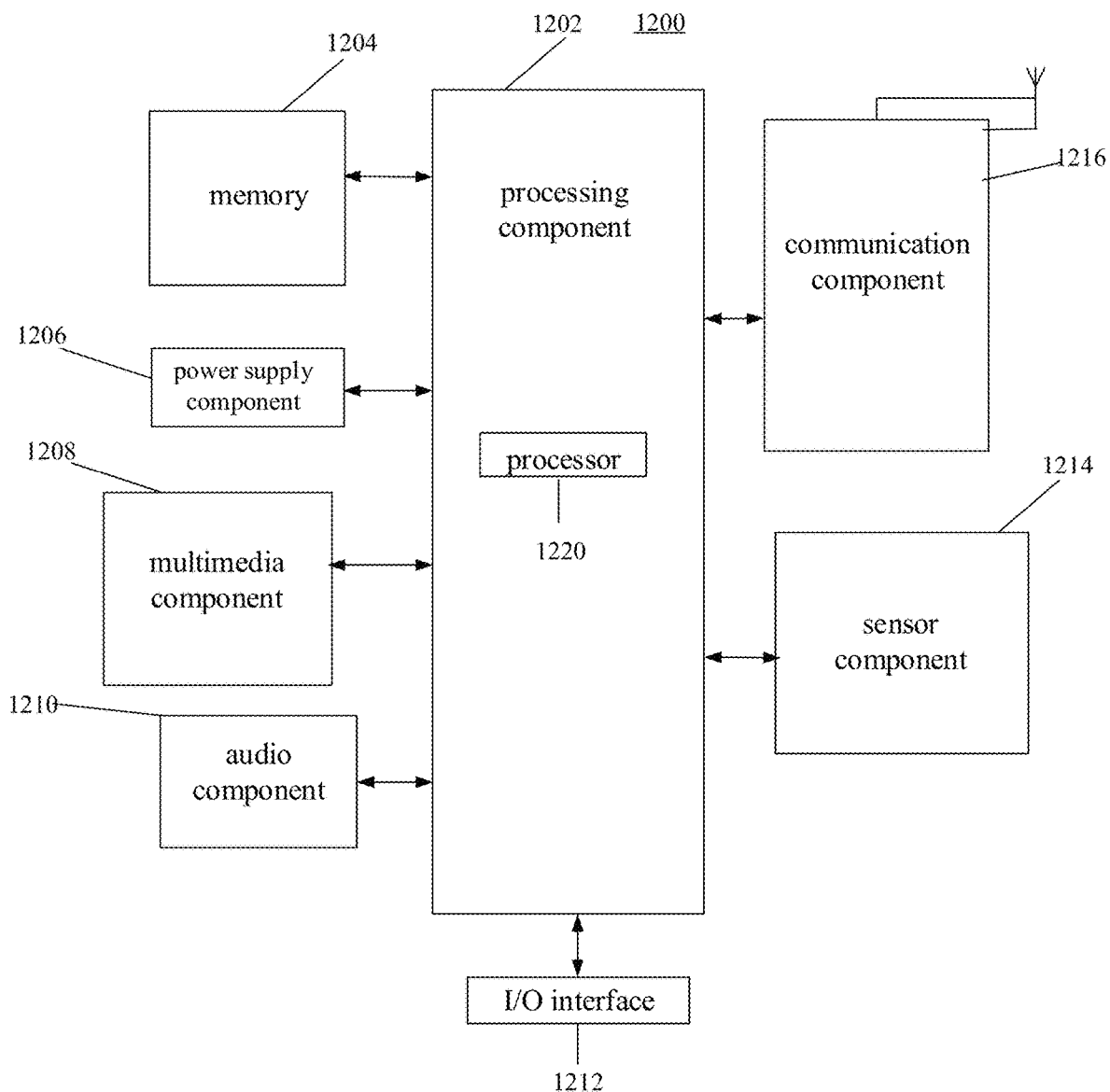
FIG. 12 is a block diagram illustrating a device for transmitting feedback information in direct communication according to an embodiment.

FIG. 12 is a block diagram illustrating a device 1200 for transmitting feedback information in direct communication according to an example embodiment. For example, the device 1200 may be a mobile phone, a computer, a digital broadcasting terminal, a messaging device, a game console, a tablet device, a medical equipment, a fitness equipment, a personal digital assistant, etc. The device 1200 may be a first terminal, and also may be a second terminal.

Referring to FIG. 12, the device 1200 may include one or more components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls the whole operation of the device 1200, such as the operations related to display, phone call, data communication, camera operation and recording operation. The processing component 1202 may include one or more processors 1220 to perform instructions, to complete all or part of blocks of the above method. In addition, the processing component 1202 may include one or more modules for the convenience of interaction between the processing component 1202 and other components. For example, the processing component 1202 may include a multimedia module for the convenience of interaction between the multimedia component 1208 and the processing component 1202.

The memory 1204 is configured to store all types of data to support the operation of the device 1200. Examples of the data include the instructions of any applications or methods operated on the device 1200, contact data, phone book data, messages, pictures, videos, etc. The memory 1204 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1206 may provide power supply for all components of the apparatus 1200. The power supply component 1206 may include power supply management system, one or more power supplies, and other units related to generating, managing and distributing power for the device 1200.

The multimedia component 1208 includes an output interface screen provided between the device 1200 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touching or sliding action, but also detect the duration and pressure related to the touching or sliding operation. In some embodiments, the multimedia component 1208 includes a front camera and/or a rear camera. When the apparatus 1200 is in operation mode, such as a shooting mode or a video mode, the front camera or the rear camera may receive the external multimedia data. Each front camera and rear camera may be a fixed optical lens system or may have a focal length and an optical zoom capacity.

The audio component 1210 is configured as output and/or input signal. For example, the audio component 1210 includes a microphone (MIC). When the device 1200 is in operation mode, such as call mode, record mode, and speech recognition mode, the microphone is configured to receive the external audio signals. The audio signals received may be further stored in the memory 1204 or sent via the communication component 1216. In some embodiments, the audio component 1210 further includes a speaker configured to output an audio signal.

The I/O interface 1212 provides an interface for the processing component 1202 and the peripheral interface module, and the peripheral interface module may be a keyboard, a click wheel, a button, etc. The buttons may include but not limited to a home button, a volume button, a start button and a lock button.

The sensor component 1214 includes one or more sensors, configured to provide various aspects of status assessments for the device 1200. For example, the sensor component 1214 may detect an on/off state of the device 1200 and the relative positioning of components, e.g., a display and a keypad of the device 1200, a change in position of the device 1200 or a component of the device 1200, a presence or absence of users contact with the device 1200, an orientation or an acceleration/deceleration of the device 1200, and a change in temperature of the device 1200. The sensor component 1214 may include a proximity sensor configured to detect the presence of the objects nearby without any physical contact. The sensor component 1214 may further include a light sensor such as a CMOS or CCD image sensor for use in imaging applications. In some embodiments, the sensor component 1214 may further include an acceleration transducer, a gyroscope sensor, a magnetic sensor, a pressure sensor or a temperature sensor.

The communication component 1216 is configured for the convenience of wire or wireless communication between the device 1200 and other devices. The device 1200 may access wireless networks based on a communication standard, such as WiFi, 2G or 3G, or their combination. In an exemplary embodiment, the communication component 1216 receives broadcast signals or broadcast-related information from an external broadcast management system via a broadcast channel. In an exemplary embodiment, the communication component 1216 further includes a near field communication (NFC) module to facilitate short-range communications.

In an exemplary embodiment, the device 1200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an example embodiment, a non-transitory computer readable storage medium is further provided which includes instructions, such as the memory 1204 including instructions. The instructions may be executed by the processor 1220 of the device 1200 to complete the above methods. For example, the non-transitory computer readable storage medium may be a ROM, a random access memory (RAM), a CD-ROM, a magnetic tape, a floppy disk, an optical data storage device, etc.

A non-transitory computer readable storage medium is further provided. When the instructions in the non-transitory computer readable storage medium are executed by the processor of the mobile terminal so that the mobile terminal may execute the method for transmitting feedback information in direct communication.

According to an example embodiment of the disclosure, there is provided a system for transmitting feedback information in direct communication. The system includes a first terminal and a second terminal; the first terminal includes an apparatus for transmitting feedback information in direct communication in embodiments as illustrated in FIG. 9 and FIG. 10; the second terminal includes an apparatus for transmitting feedback information in direct communication in embodiments as illustrated in FIG. 11.

According to an example embodiment of the disclosure, there is provided a system for transmitting feedback information in direct communication. The system for transmitting feedback information includes a first terminal and a second terminal; the first terminal and the second terminal are terminals in embodiments as illustrated in FIG. 12.

According to an example embodiment of the disclosure, there is provided a computer readable storage medium with at least one instruction, at least one program, a set of codes and a set of instructions stored thereon. The at least one instruction, the at least one program, the set of codes or the set of instructions are loaded and executed by the processor to implement the method for feedback information transmission in direct communication as described above.

The technical scheme according to embodiments of the disclosure may include the following beneficial effect: after the first terminal determines that the second terminal sends direct data to the first terminal for the last time with the first blind retransmission mechanism, the first terminal transmits HARQ feedback information to the second terminal, so as to indicate the receiving state of the direct data after blind retransmission is completed through the HARQ feedback information. Since the second terminal may not receive the HARQ feedback information due to some reasons, the first terminal needs to retransmit the HARQ feedback information to the second terminal with the second blind retransmission mechanism. In this way, even if the second terminal does not receive a certain transmission of the HARQ feedback information, the second terminal may receive the retransmitted HARQ feedback information, which may avoid wasting network resources caused by resending the direct data to the first terminal with the first blind retransmission mechanism since the second terminal mistakenly determines that the first terminal has not received direct data. The effect of saving the network resources may be thus achieved.

After considering the specification and practicing the disclosure herein, those skilled in the art will easily think of other embodiments of the disclosure. The disclosure is intended to cover any variations, usages, or adaptive changes of the disclosure, which follow the general principles of the disclosure and include common knowledge or conventional technical means in the art not described in the disclosure. The description and the embodiments are to be regarded as exemplary only, and the true scope and spirit of the disclosure are given by the appended claims.

It should be understood that the present disclosure is not limited to the precise structure described above and shown in the drawings, and various modifications and changes may be made without departing from its scope. The scope of the disclosure is only limited by the appended claims.

What is claimed is:

1. A method for transmitting feedback information in direct communication, comprising:
   in response to a second terminal sending direct data to a first terminal with a first blind retransmission mechanism for a last time, transmitting, by the first terminal, hybrid automatic repeat request (HARQ) feedback information to the second terminal, in which the HARQ feedback information is configured to indicate a receiving state of the first terminal for the direct data; and
   retransmitting, by the first terminal, the HARQ feedback information to the second terminal with a second blind retransmission mechanism.

2. The method of claim 1, wherein retransmitting, by the first terminal, the HARQ feedback information to the second terminal with the second blind retransmission mechanism comprises:
   determining, by the first terminal, a first retransmission time interval configured to indicate a time interval between two adjacent transmissions of the HARQ feedback information; and
   retransmitting, by the first terminal, the HARQ feedback information to the second terminal based on the first retransmission time interval.

3. The method of claim 2, wherein determining, by the first terminal, the first retransmission time interval comprises:
   acquiring, by the first terminal, a first resource location where the HARQ feedback information is transmitted to the second terminal for a first time, and determining the first retransmission time interval based on the first resource location, wherein different first resource locations correspond to different first retransmission time intervals; or
   acquiring, by the first terminal, a second resource location where the HARQ feedback information is transmitted to the second terminal for a last time, and determining the first retransmission time interval based on the second resource location, wherein different second resource locations correspond to different first retransmission time intervals.

4. The method of claim 3, wherein determining the first retransmission time interval based on the first resource location comprises:
   acquiring, by the first terminal, a first corresponding relationship configured to indicate a relationship between the first resource locations and the first retransmission time intervals; and
   querying, by the first terminal, a first retransmission time interval corresponding to the acquired first resource location in the first corresponding relationship.

5. The method of claim 3, wherein determining the first retransmission time interval based on the second resource location comprises:
   acquiring, by the first terminal, a second corresponding relationship configured to indicate a relationship between the second resource locations and the first retransmission time intervals; and
   querying, by the first terminal, a first retransmission time interval corresponding to the acquired second resource location in the second corresponding relationship.

6. The method of claim 2, wherein determining, by the first terminal, the first retransmission time interval comprises:
   acquiring, by the first terminal, a second retransmission time interval configured to indicate a time interval between two adjacent transmissions of the direct data; and
   determining, by the first terminal, the second retransmission time interval as the first retransmission time interval.

7. The method of claim 2, wherein retransmitting, by the first terminal, the HARQ feedback information to the second terminal comprises:
   determining, by the first terminal, a set of resources for retransmitting the HARQ feedback information based on the first retransmission time interval, the set of resources comprising at least one of time resources, frequency resources, and code resources;
   dividing, by the first terminal, the set of resources into at least two subsets of orthogonal resources; and
   retransmitting, by the first terminal, the HARQ feedback information to the second terminal with resources in a target subset of orthogonal resources from the at least two subsets of orthogonal resources based on a number of retransmissions, wherein different numbers of retransmissions correspond to different target subsets of orthogonal resources.

8. The method of claim 1, wherein the HARQ indication information is first HARQ indication information, and the method further comprises:
   acquiring, by the first terminal, configuration information; and
   determining, by the first terminal, based on the configuration information to transmit the first HARQ feedback information to the second terminal; or
   determining, by the first terminal, based on the configuration information to receive second HARQ feedback information transmitted by a third terminal, wherein the time resources for transmitting the first HARQ feedback information are the same as the time resources for transmitting the second HARQ feedback information.

9. A method for transmitting feedback information in direct communication, comprising:
   in response to a second terminal sending direct data to a first terminal with a first blind retransmission mechanism for a last time, receiving, by the second terminal, hybrid automatic repeat request (HARQ) feedback information transmitted by the first terminal, in which the HARQ feedback information is configured to indicate a receiving state the first terminal for the direct data; and
   receiving, by the second terminal, the HARQ feedback information retransmitted by the first terminal with a second blind retransmission mechanism.

10. The method of claim 9, wherein receiving, by the second terminal, the HARQ feedback information retransmitted by the first terminal with the second blind retransmission mechanism comprises:
   determining, by the second terminal, a first retransmission time interval configured to indicate a time interval between two adjacent transmissions of the HARQ feedback information; and receiving, by the second terminal, the HARQ feedback information retransmitted by the first terminal based on the first retransmission time interval.

11. The method of claim 10, wherein, determining, by the second terminal, the first retransmission time interval comprises:
acquiring, by the second terminal, a first resource location where the HARQ feedback information transmitted by the first terminal is received for a first time, and determining the first retransmission time interval based on the first resource location, wherein different first resource locations correspond to different first retransmission time intervals; or
acquiring, by the second terminal, a second resource location where the HARQ feedback information transmitted by the first terminal is received for a last time, and determining the first retransmission time interval based on the second resource location, wherein different second resource locations correspond to different first retransmission time intervals.

12. The method of claim 11, wherein determining the first retransmission time interval based on the first resource location comprises:
acquiring, by the second terminal, a first corresponding relationship configured to indicate a relationship between the first resource locations and the first retransmission time intervals; and
querying, by the second terminal, a first retransmission time interval corresponding to the acquired first resource location in the first corresponding relationship.

13. The method of claim 11, wherein determining the first retransmission time interval based on the second resource location comprises:
acquiring, by the second terminal, a second corresponding relationship configured to indicate a relationship between the second resource locations and the first retransmission time intervals; and
querying, by the second terminal, a first retransmission time interval corresponding to the acquired second resource location in the second corresponding relationship.

14. The method of claim 10, wherein determining, by the second terminal, the first retransmission time interval comprises:
acquiring, by the second terminal, a second retransmission time interval configured to indicate a time interval between two adjacent transmissions of the direct data; and
determining, by the second terminal, the second retransmission time interval as the first retransmission time interval.

15. The method of claim 10, wherein receiving, by the second terminal, the HARQ feedback information retransmitted by the first terminal comprises:
determining, by the second terminal, a set of resources for retransmitting the HARQ feedback information based on the first retransmission time interval, the set of resources comprising at least one of time resources, frequency resources, and code resources;
dividing, by the second terminal, the set of resources into at least two subsets of orthogonal resources;
receiving, by the second terminal, the HARQ feedback information retransmitted by the first terminal with resources in a target subset of orthogonal resources from the at least two subsets of orthogonal resources based on a number of retransmissions, wherein different numbers of retransmissions correspond to different target subsets of orthogonal resources.

16. A first terminal, comprising:
a processor; and
a memory configured to store instructions executable by the processor;
wherein, the processor is configured to:
in response to a second terminal sending direct data to the first terminal with a first blind retransmission mechanism for a last time, transmit hybrid automatic repeat request (HARQ) feedback information to the second terminal, in which the HARQ feedback information is configured to indicate a receiving state the first terminal for the direct data; and
retransmit the HARQ feedback information to the second terminal with a second blind retransmission mechanism.

17. The first terminal of claim 16, wherein the processor is further configured to:
determine a first retransmission time interval configured to indicate a time interval between two adjacent transmissions of the HARQ feedback information; and
retransmit the HARQ feedback information to the second terminal based on the first retransmission time interval.

18. The first terminal of claim 17, wherein the processor is further configured to:
acquire a first resource location where the HARQ feedback information is transmitted to the second terminal for a first time and a first corresponding relationship, and
query a first retransmission time interval corresponding to the acquired first resource location in the first corresponding relationship; or
acquire a second resource location where the HARQ feedback information is transmitted to the second terminal for a last time and a second corresponding relationship, and query a second retransmission time interval corresponding to the acquired second resource location in the second corresponding relationship;
wherein the first corresponding relationship is configured to indicate a relationship between the first resource locations and the first retransmission time intervals, and the second corresponding relationship is configured to indicate a relationship between the second resource locations and the first retransmission time intervals.

19. The first terminal of claim 17, wherein the processor is further configured to:
acquire a second retransmission time interval configured to indicate a time interval between two adjacent transmissions of the direct data; and
determine the second retransmission time interval as the first retransmission time interval.

20. The first terminal of claim 17, wherein the processor is further configured to:
determine a set of resources for retransmitting the HARQ feedback information based on the first retransmission time interval, the set of resources comprising at least one of time resources, frequency resources, and code resources;
divide the set of resources into at least two subsets of orthogonal resources; and
retransmit the HARQ feedback information to the second terminal with resources in a target subset of orthogonal resources from the at least two subsets of orthogonal resources based on a number of retransmissions, wherein different numbers of retransmissions correspond to different target subsets of orthogonal resources.

\* \* \* \* \*